United States Patent
Smith et al.

(10) Patent No.: US 9,955,274 B2
(45) Date of Patent: Apr. 24, 2018

(54) VIBRATION MONITORING SYSTEMS

(71) Applicant: The Boeing Company, Chicago, IL (US)

(72) Inventors: Nicholas Samuel Lee Smith, Kent, WA (US); Jared R. Pothier, Maple Valley, WA (US); Cary Dean Munger, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 32 days.

(21) Appl. No.: 14/681,939

(22) Filed: Apr. 8, 2015

(65) Prior Publication Data
US 2016/0302019 A1  Oct. 13, 2016

(51) Int. Cl.
| | |
|---|---|
| *G01H 1/00* | (2006.01) |
| *H04R 29/00* | (2006.01) |
| *G01M 99/00* | (2011.01) |
| *H04R 3/04* | (2006.01) |
| *G01M 7/00* | (2006.01) |
| *G01M 13/04* | (2006.01) |
| *G09F 9/00* | (2006.01) |

(52) U.S. Cl.
CPC ............ *H04R 29/008* (2013.01); *G01H 1/00* (2013.01); *G01M 99/005* (2013.01); *H04R 3/04* (2013.01); *G01M 7/00* (2013.01); *G01M 13/045* (2013.01); *G09F 9/00* (2013.01)

(58) Field of Classification Search
CPC . B64D 47/00; G09F 9/00; G01H 1/00; G01M 99/005; G01M 7/00; G01M 13/045; H04R 29/008; H04R 3/04

USPC .......................................................... 73/579
See application file for complete search history.

(56) References Cited

U.S. PATENT DOCUMENTS

| | | | |
|---|---|---|---|
| 3,487,263 A | 12/1969 | Pahlavan | |
| 4,028,947 A * | 6/1977 | Cowen | G01H 3/12 73/647 |
| 4,475,401 A * | 10/1984 | Punia | G01H 3/14 73/658 |
| 5,517,183 A | 5/1996 | Bozeman, Jr. | |
| 6,990,453 B2 | 1/2006 | Wang et al. | |

(Continued)

FOREIGN PATENT DOCUMENTS

| | | |
|---|---|---|
| DE | 102009048301 A1 | 4/2011 |
| WO | 9960352 A1 | 11/1999 |

OTHER PUBLICATIONS

Eshleman, Ronald L., "Basic Machinery Vibrations: An Introduction to machine testing, analysis, and monitoring," pp. A5-A8, VIPress, 1999.

(Continued)

*Primary Examiner* — Manish S Shah
*Assistant Examiner* — Rose M Miller
(74) *Attorney, Agent, or Firm* — Kolisch Hartwell, P.C.

(57) ABSTRACT

A vibration monitoring and analysis system may include a transducer configured to convert sensed vibration into an alternating current. A processing module may analyze the alternating current and produce an output configured to convey information regarding characteristics of the alternating current. One or more analysis modules may be utilized to compare a waveform of the sensed vibration to known patterns, for example to identify known events and/or conditions.

9 Claims, 8 Drawing Sheets

(56) References Cited

U.S. PATENT DOCUMENTS

| | | | |
|---|---|---|---|
| 2006/0140425 A1* | 6/2006 | Berg | A61B 5/00 |
| | | | 381/312 |
| 2009/0303076 A1* | 12/2009 | Setiadi | H04Q 9/00 |
| | | | 340/870.01 |
| 2012/0065905 A1 | 3/2012 | Rank et al. | |
| 2014/0263989 A1* | 9/2014 | Valentino | G01T 1/02 |
| | | | 250/239 |
| 2015/0333598 A1* | 11/2015 | Conticchio | F03G 5/06 |
| | | | 290/1 R |

OTHER PUBLICATIONS

European Patent Office, Extended European Search Report in European Patent Application No. 16162773.2-1559, dated Aug. 25, 2016, 12 pages.

* cited by examiner

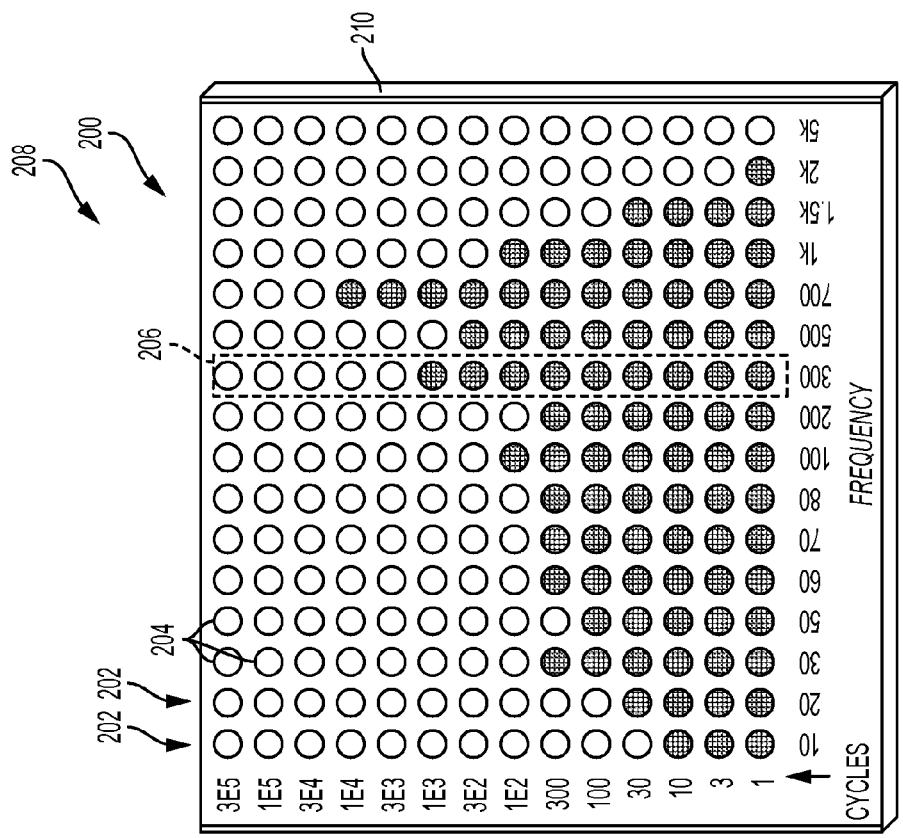
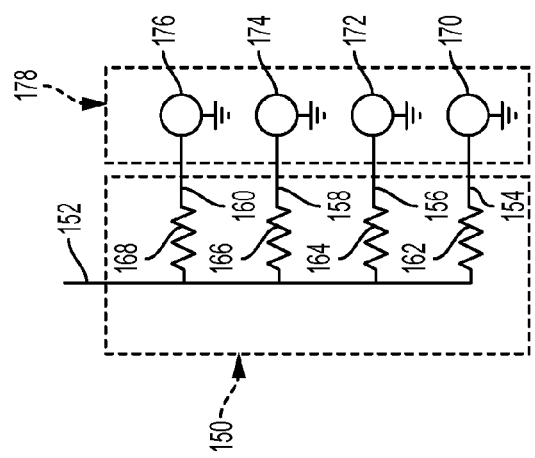
FIG. 5
FIG. 4

VIBRATION MONITORING SYSTEMS

CROSS-REFERENCES

The following related applications and materials are incorporated herein, in their entireties, for all purposes: U.S. Pat. No. 6,990,453, entitled "System and Methods for Recognizing Sound and Music Signals in High Noise and Distortion."

FIELD

This disclosure relates to devices and methods for monitoring equipment and physical systems. More specifically, the disclosed embodiments relate to monitoring and subsequent analysis of vibration and/or sound.

INTRODUCTION

Many systems and components, especially electronics, may be susceptible to damage based on exposure to mechanical stress over time. For example, repeated and/or prolonged exposure to energies in the form of vibration, shock, and the like may cause failure or degradation of sensitive components. Even more durable components, such as structural supports, panels, and protective enclosures, may be negatively affected over time.

Commercial and military aircraft present illustrative examples of this problem. An aircraft has systems throughout its entire length. Many of the systems are critical to the mission and/or performance of the aircraft. For example, airplanes have radar electronics in the forward fuselage, hydraulic and pneumatic systems throughout the fuselage, etc. Military programs have even a broader suite of systems and electronics, many of which are mission critical and some which are flight critical.

In general, all systems installed on an aircraft are qualified to survive a level of vibration expected in the field. This qualification may be done by performing a vibration and shock qualification test. The vibration levels used in this test are the best predicted vibration loads based on the hardware weight, location, and an assumed flight profile.

However, the actual environment experienced by an aircraft and/or its onboard systems is often different than what was anticipated when the qualification levels were established. For example, aircraft may be flown differently than originally envisioned. Mission parameters change with emerging needs, and original assumptions regarding the flight profile rarely stay unchanged throughout the life of an aircraft. In another example, certain military aircraft may remain in service beyond the planned service life. In another example, components may be moved around within an airplane to facilitate design changes, or even moved between aircraft. In some examples, components may be mounted differently than anticipated by the design team. In other examples, errors or mistaken assumptions may be made in the original specifications.

Significant effort and expense is expended reviewing the lives of different components. Airplane owners need a reliable and quantitative understanding of how the life of onboard electronics compares to the planned service usage of the aircraft.

Furthermore, vibration may be useful for identifying conditions and events related to machinery. Current machinery monitoring systems may require a devoted sensor, wiring, power, and data acquisition system. Additionally, some systems are typically unmonitored, such as doors, lavatories, pumps, and the like. Nevertheless, a seasoned mechanic or experienced user can often detect signs of impending failure or recognize sounds and vibrations associated with certain events. Accordingly, a system or method is desirable for detecting such events and conditions remotely by monitoring the vibrational environment.

SUMMARY

The present disclosure provides systems, apparatuses, and methods relating to vibration monitoring and analysis. In some embodiments, a vibration indication system comprising may include a transducer configured to generate an alternating current in response to a sensed vibration, the alternating current having at least one component frequency; a processing circuit in communication with the transducer, the processing circuit configured to produce a first output when the component frequency falls within a first frequency range; and an array of visual elements in communication with the processing circuit, the array being configured to change from a first persistent visual state to a second persistent visual state in response to the first output of the processing circuit.

In some embodiments, a sensor system may include a transducer configured to convert vibration into an electrical signal; a non-powered processor module electrically coupled to the transducer, the processor module being configured to produce a first output when the electrical signal has a frequency component in a first frequency range and to produce a second output when the electrical signal has a frequency component in a second frequency range; and an array including a first visual indicator and a second visual indicator, the array being in communication with the processor module; wherein the first visual indicator is configured to change state persistently in response to a first instance of the first output, and the second visual indicator is configured to change state persistently in response to a first instance of the second output.

In some embodiments, a method of monitoring a device for vibration exposure may include sensing a vibration using an unpowered transducer coupled to a device being monitored; determining a frequency and amplitude of the sensed vibration using an electrical circuit in communication with the transducer, the circuit including a tiered plurality of band pass filters and powered only by an output of the transducer; and visually displaying the frequency and amplitude information using a passive display.

In some embodiments, a method of monitoring a device for vibration exposure may include converting a sensed vibration into an AC electrical signal using a transducer; splitting the AC electrical signal into a plurality of subsignals using a tiered plurality of band pass filters, such that each subsignal corresponds to a respective component frequency range; rectifying each of the subsignals to produce a respective DC voltage having an amplitude corresponding to a strength of the respective subsignal; and updating a visual display to persistently indicate information corresponding the component frequency range of at least one of the subsignals.

In some embodiments, an equipment monitoring system may include a transducer configured to convert oscillational energy into an electrical signal having a waveform; and a processor in communication with the transducer and with a memory store, the processor including a signature module configured to continually generate, based on the waveform, a spectrogram and a Fourier transform (FT); the processor further including a comparison module in communication with the signature module, the comparison module being configured to identify occurrences of known events by comparing a pattern of features of the generated spectrogram to a plurality of known spectrogram feature patterns stored in the memory store, and to identify possible equipment failures by comparing the generated FT to an expected FT.

In some embodiments, a method for monitoring a plurality of devices in a space may include sensing oscillational energy produced by a plurality of devices in a space; converting the sensed oscillational energy into an electrical signal having a waveform; continually generating, based on the waveform, a spectrogram and a Fourier transform (FT); identifying an occurrence of a known event by comparing a pattern of features of the generated spectrogram to a plurality of known spectrogram feature patterns; and identifying possible equipment failures by comparing the generated FT to an expected FT.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 4 is a circuit diagram showing an illustrative resistor and indicator arrangement suitable for use in a cumulative vibration monitoring system in accordance with aspects of the present disclosure.

FIG. 5 depicts an illustrative human readable interface suitable for use in a cumulative vibration monitoring system in accordance with aspects of the present disclosure.

DESCRIPTION

Overview

Various embodiments of a vibration monitoring system are described below and illustrated in the associated drawings. Unless otherwise specified, a vibration monitoring system and/or its various components may, but are not required to, contain at least one of the structure, components, functionality, and/or variations described, illustrated, and/or incorporated herein. Furthermore, the process steps, structures, components, functionalities, and/or variations described, illustrated, and/or incorporated herein in connection with the present teachings may, but are not required to, be included in other similar monitoring systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Figure 1:
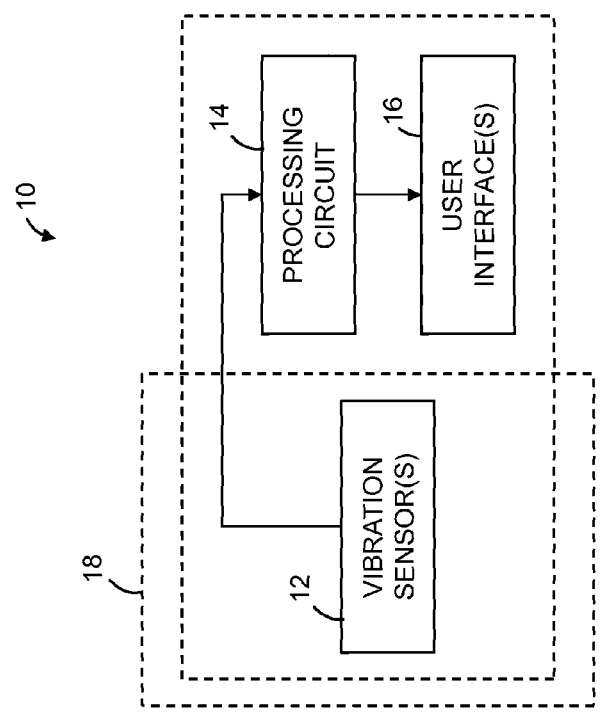
FIG. 1 is a schematic diagram of an illustrative vibration monitoring system in accordance with aspects of the present disclosure.

A vibration monitoring system is shown in FIG. 1, and generally indicated at 10. In general, vibration monitoring system 10 may include a vibration sensor 12. Vibration sensor 12 may include any suitable transducer(s) configured to convert between pressure and electrical energy. For example, vibration sensor 12 may include one or more piezoelectric elements, microphones, accelerometers, strain gauges, and/or the like, or any combination of these. Vibration sensor 12 may be passive. In other words, a vibration sensor may be unpowered or non-powered, although the vibration sensor may generate electrical energy in response to a sensed pressure change or oscillational energy (e.g., a vibration). Piezoelectric elements may be especially suitable for use as vibration sensors. For example, piezoelectric wafers comprising quartz, ceramic, synthetic ceramic, and/or a suitable plastic (e.g., polyvinylidene difluoride (PVDF)) may be used.

A signal generated by vibration sensor 12 may be passed to a processing circuit 14 for analysis. In general, the signal may be representative of a sensed vibration, and may include a waveform. Processing circuit 14 may include any suitable electrical and/or electronic circuit or module, and/or any suitable computer-implemented software modules, configured to determine one or more characteristics of the waveform. For example, processing circuit 14 may determine frequency components of the signal, amplitudes of the overall signal as well as of frequency components, patterns within the waveform, durations of one or more aspects of the signal, and/or time varying changes in the waveform. Processing circuit 14 may be analog, digital, or a combination of analog and digital.

Depending on the desired use, information determined by processing circuit 14 may be displayed or otherwise communicated through a user interface 16 in communication with the processing circuit. User interface 16 may include any suitable structure and/or device configured to communicate (e.g., display, announce) information relating to the sensed vibration signal. For example, user interface 16 may include a passive visual display comprising an array of visual indicators or elements. Each element may correspond to a particular frequency and/or amplitude of the signal. In some examples, a graphical user interface may be used. In some examples, a powered interface may be used. For example, a display screen may display text, colors, alerts, and/or any other suitable visual communication relating to the vibration signal. For example, processing circuit 14 may determine that the characteristics of the signal match a known pattern, and a user may be alerted to the presence of that known pattern via a textual message on a display screen.

Vibration sensor 12 may be disposed on or in a monitored environment 18. Monitored environment 18 may include any defined space, device, or equipment to be monitored by system 10. For example, monitored environment 18 may include a specific piece of equipment, and vibration sensor 12 may be mounted to the piece of equipment. In other examples, monitored environment 18 may include an enclosed space (e.g., a room or an aircraft) containing a plurality of devices to be monitored by system 10, and vibration sensor 12 may be disposed at a central location capable of simultaneously receiving vibrational energy from the plurality of devices.

As indicated in FIG. 1, vibration sensor 12 may be disposed in or on a monitored environment 18, while other components of system 10 may be disposed elsewhere. For example, processing circuit 14 and/or interface 16 may be spaced from the monitored environment. In some examples, all components are in or on the monitored environment. In some examples, vibration sensor 12, processing circuit 14, and interface 16 are packaged as a unit.

Aspects of a vibration monitoring system may be embodied as a computer method, computer system, or computer program product. Accordingly, aspects of the vibration monitoring system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the vibration monitoring system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the vibration monitoring system may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the vibration monitoring system are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the vibration monitoring system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Examples, Components, and Alternatives

The following sections describe selected aspects of exemplary vibration monitoring systems as well as related systems and/or methods. The examples in these sections are intended for illustration and should not be interpreted as limiting the entire scope of the present disclosure. Each section may include one or more distinct inventions, and/or contextual or related information, function, and/or structure.

Figure 2:
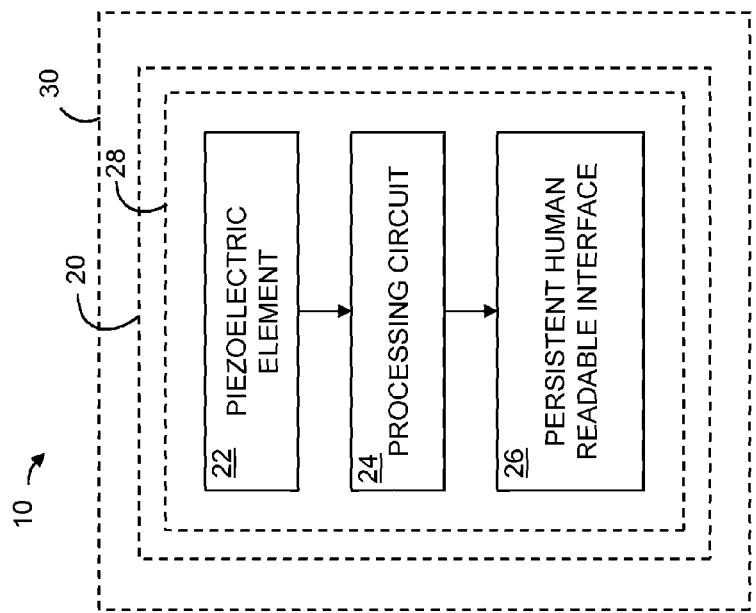
FIG. 2 is a schematic diagram of an illustrative vibration monitoring system having a passive circuit and persistent human readable interface.

Section 1:

As shown in FIG. 2, this section describes a passive energy exposure indication system 20 having a human-readable, persistent display. System 20 is an embodiment of vibration monitoring system 10, described above. Accordingly, similar components may be labeled with similar reference numbers.

FIG. 2 is a schematic diagram depicting a passive energy exposure indication system in accordance with aspects of the present disclosure and indicated at 20. System 20 includes a sensing transducer 22 in communication with a processing circuit 24, and a human readable interface 26 which responds to one or more outputs of circuit 24. System 20 may include a substrate 28, the substrate being configured to couple system 20 to a host device or system 30, For example, system 20 may be coupled to a piece of electronic equipment to be monitored.

Sensing transducer 22 may include any suitable transducer configured to generate an alternating current in response to applied mechanical stress (e.g., pressure, vibration, strain, and the like). For example, transducer 22 may respond to a sensed vibration. In some embodiments, transducer 22 may include a piezoelectric element. For example, transducer 22 may include one or more piezoelectric wafers comprising quartz, ceramic, synthetic ceramic, and/or a suitable plastic (e.g., polyvinylidene difluoride (PVDF)). In the embodiments described with respect to system 20, the sensing transducer and the system in general may be passive. In other words, no power source may be present other than the electrical energy generated by the transducer in response to a sensed vibration. Transducer 22 may be spaced from remaining components of system 20, such as being disposed on a remote host and operatively connected to processing circuit 24 by one or more wires or other electrical transmission members.

A vibration sensed by transducer 22 may be converted into an alternating current having one or more component frequencies. The alternating current is communicated to processing circuit 24 for analysis and processing. Processing circuit 24 may include a filtering portion configured to separate the component frequencies using, for example, one or more band pass filters. Processing circuit 24 may further include a processing portion configured to tune the signal resulting from each band pass filter to a desired output. An illustrative embodiment of processing circuit 24 is described in greater detail below (see Section 2).

Human readable interface (HRI) 26 may include any suitable visual indicator(s) configured to respond to the output of processing circuit 24 by indicating one or more characteristics of the output. For example, a portion of HRI 26 may change state when an output of processing circuit 24 corresponds to a selected frequency range and amplitude of the sensed vibration.

HRI 26 may include one or more persistent components, such that a change in visual state is permanent and/or persists until further changes are induced. For example, HRI 26 may include a matrix or an array of persistent visual indicators. For example, HRI 26 may include an array of visual indicators, such as a one- or two-dimensional rectilinear array. Additionally or alternatively, HRI 26 may include other arrangements of visual indicators, such as concentric circles (e.g., a bullseye), dots arranged in one or more arcs (e.g., a tachometer), parts of a whole, a single element that changes characteristics, elements that change shape, tactile elements (e.g., pop-up buttons), elements that spell a word or number, and/or the like, or any combination of these.

Visual indicators may include any suitable elements configured to change state persistently and/or permanently. Visual indicators may have discrete visual states, such as binary or on/off states. In some examples, visual indicators may include a range of continuous visual states. In some embodiments, visual indicators may include one or more low-voltage diodes (e.g., light emitting, crystal, or point contact), one or more elements comprising a thermochromatic material, and the like, or any combination of these.

Substrate 28 may comprise a body containing or supporting the other components of system 20. For example, substrate 28 may include a chip, layer, sheet, or gel. Substrate 28 may include a connection mechanism for coupling system 20 to host 30. The connection mechanism may include an adhesive, bonding agent, mechanical fastener, and/or the like, or any combination of these. In some embodiments, substrate 28 may include a sticker for straightforward attachment of system 20 to host 30. In some embodiments, system 20 may be integrated into host 30. In those embodiments, substrate 28 may comprise a portion of host 30, such as a panel or enclosure.

Host 30 may include any suitable device or system to be monitored by system 20. For example, host 30 may include electronics, a body panel, a thin panel (e.g., on a fuselage), a structural member, landing gear, struts, spars, shipping containers, external doors, and/or the like.

Figure 3:
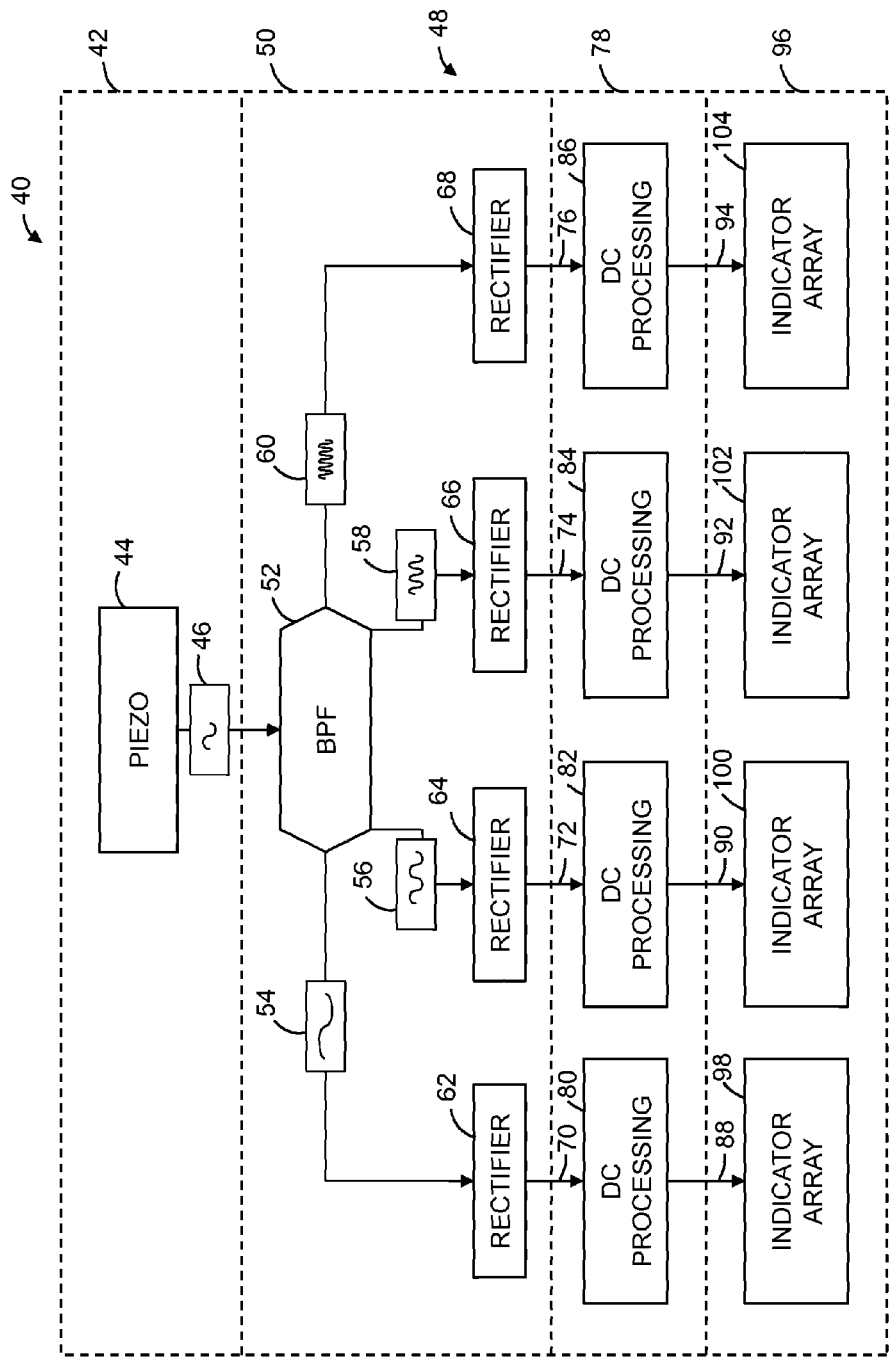
FIG. 3 is a block diagram depicting an illustrative embodiment of the vibration monitoring system of FIG. 2.

Section 2:

As shown in FIG. 3, this section describes a passive energy exposure indication system 40 (e.g., a sensor) having a human-readable, persistent display. System 40 is an embodiment of system 20, described above. Accordingly, similar components may be labeled with similar reference numbers.

FIG. 3 is a schematic diagram showing relationships between selected components of system 40.

Passive energy exposure indication system 40 includes a sensing portion 42 having a sensor 44 in the form of a piezoelectric element or wafer. Sensor 44 may include any suitable transducer configured to produce an alternating current 46 in the presence of vibration.

Sensing portion 42 is in communication with a processing circuit 48. Processing circuit 48 includes a filtering portion 50. Filtering portion 50 may include any suitable filtering components or devices configured to separate alternating current 46 into one or more component frequency bands. For example, filtering portion 50 may include a tiered array of bandpass filters 52 configured to separate alternating current 46 into a low frequency component 54, a low/mid frequency component 56, a high/mid frequency component 58, and a high frequency component 60. While four component bands are described with respect to system 40, any suitable number of bands may be utilized depending, for example, on desired visual display or granularity of frequency tracking.

Filtering portion 50 includes rectifiers 62-68 (e.g., bridge rectifiers), each configured to rectify a component signal produced by bandpass filters 52. Accordingly, in this example, four rectified (i.e., direct current (DC)) electrical signals 70-76 will be output from filtering portion 50, each DC signal having an amplitude corresponding to a strength of the corresponding frequency component within the sensed vibration. In other words, the amplitude of a given one of DC signals 70-76 will be proportional to the strength of the corresponding component frequency band within alternating current 46. Each of the DC signals may be referred to as a subsignal.

Processing circuit 48 further includes a DC processing portion 78 having a plurality of DC processing banks 80-86. Each one of DC processing banks 80-86 includes an analog network of components (e.g., resistors) configured to produce an output signal 88-94 that corresponds to one or more characteristics of the received DC signal (70-76). These characteristics may include, for example, amplitude and/or duration. Output signals 88-94 are communicated to a visual display portion 96 of system 40. For example, each DC processing bank may be operatively connected to one or more visual indicators associated with the same component frequency range. One or more outputs of the individual DC processing bank will produce a persistent change in visual display portion 96, according to selected rules or rubrics having to do with the selected characteristics being analyzed.

Accordingly, visual display portion 96 may include an array of visual indicators, subdivided into several indicator arrays 98-104. In this example, each indicator array is associated with one of the component frequency ranges, and configured to receive an output of a corresponding DC processing bank. Each indicator array therefore changes state in response to the characteristic(s) of the corresponding frequency component within the sensed vibration.

As described above, a vibration indication system may include a transducer configured to generate an alternating current in response to a sensed vibration, the alternating current having at least one component frequency. A processing circuit may be in communication with the transducer, the processing circuit configured to produce a first output when the component frequency falls within a first frequency range. An array of visual elements may be in communication with the processing circuit, the array being configured to change from a first persistent visual state to a second persistent visual state in response to the first output of the processing circuit.

In another embodiment, the system may be described as a sensor including a transducer configured to convert vibration into an electrical signal. A non-powered processor module may be electrically coupled to the transducer, the processor module being configured to produce a first output when the electrical signal has a frequency component in a first frequency range and to produce a second output when the electrical signal has a frequency component in a second frequency range. An array may include a first visual indicator and a second visual indicator, the array being in communication with the processor module. The first visual indicator may be configured to change state persistently in response to a first instance of the first output, and the second visual indicator may be configured to change state persistently in response to a first instance of the second output.

Aspects of passive vibration indication systems may be utilized in the method steps described below. Where appropriate, reference may be made to previously described components and systems that may be used in carrying out each step. These references are for illustration, and are not intended to limit the possible ways of carrying out any particular step of the method. The description below may not recite the complete process. Although various steps of the method are described below, the steps need not necessarily all be performed, and in some cases may be performed in a different order than the order described.

Specifically, a method of monitoring a device for vibration exposure may include converting a sensed vibration into an AC electrical signal using a transducer. The AC electrical signal may be split into a plurality of subsignals using a tiered plurality of band pass filters, such that each subsignal corresponds to a respective component frequency range. Each of the subsignals may be rectified to produce a respective DC voltage having an amplitude corresponding to a strength of the respective subsignal. A visual display may be updated to persistently indicate information corresponding the component frequency range of at least one of the subsignals.

The splitting and rectifying may be performed using an electrical circuit powered only by the AC electrical signal. The visual display may be operatively connected to the electrical circuit. The transducer, the electrical circuit, and the visual display may be attached as a package to a device to be monitored.

Updating the visual display may further include persistently indicating information corresponding to the amplitude of the at least one of the subsignals. Updating the visual display may further include persistently indicating information corresponding to a duration of the at least one of the subsignals.

The visual display may comprise an array of visual elements. Each of the visual elements may have two possible visual states.

Examples of suitable DC processing banks and indicator arrays for use with system 40 (and others) are described in further detail below (see Sections 3-5). The embodiments described in Sections 3-5 include specific illustrative arrangements configured to produce displays of different information or different aspects of the vibration experienced by the host.

Section 3:

As shown in FIGS. 4-5, this section describes components and subsystems suitable for use in a "cumulative" version of a passive vibration monitoring system, such as system 20 and/or system 40. DC processing bank 150 is an embodiment of one or more components of DC processing portion 78 and visual display portion 96, described above. Similarly, visual display portion 200 is an embodiment of visual display portion 96, described above. Accordingly, similar components may be labeled with similar reference numbers.

FIG. 4 is a circuit diagram showing an illustrative resistor and indicator arrangement suitable for use in a cumulative vibration monitoring system. DC processing bank 150 includes any suitable arrangement or network of components configured to receive a DC signal 152 from a filtering portion (e.g., filtering portion 50) and to produce an array of output energies. The array of output energies is configured to produce a persistent change in the visual state of a connected array of indicator elements, the persistent change corresponding to accumulated vibrational energy sensed by an associated transducer.

For example, in response to one or more processing banks receiving a DC signal 152 and producing an array of output energies, the visual elements 170-176 may be configured to change from a first persistent visual state to a second persistent visual state in response to the output energies of the processing bank 150 where the output exceeds an energy threshold. In an exemplary embodiment, a number of the visual elements 170-176, corresponding to the amplitude of a first output, may change to the second persistent visual state when a respective threshold level for each visual element is exceeded, to thereby indicate a peak vibration level sensed by the transducer.

A persistent state change of a first visual indicator may correspond to a magnitude of the output, and the array may include first and second visual indicators that each has two persistent visual states or two energy threshold levels. In one exemplary embodiment, the array may include a set of visual indicators that are arranged (e.g., in linear alignment) such that a portion of the set of visual indicators may change from a first visual persistent state to a second visual persistent state to provide a visual indication of the peak vibration energy level associated with a frequency band or range that was sensed by the transducer. In this manner, for a plurality of arrays each having a set of arranged visual indicators (e.g., in linear alignment), a portion of each set of visual indicators may change from a first visual persistent state to a second visual persistent state to provide a visual indication of the peak vibration energy level for each of a plurality of component frequency bands that was sensed by the transducer.

A system including DC processing bank 150 is therefore configured to display the cumulative vibrational energy experienced by the host equipment being monitored. To achieve this functionality, DC processing bank 150 includes a network of resistive tiers. In the illustrative example depicted in FIG. 4, four such tiers (154-160) are organized in parallel to each other. Other suitable arrangements and networks of components may be used to produce a similar effect.

Each resistive tier includes one or more resistive elements (e.g., resistors). In the example depicted in FIG. 4, each tier is shown having a single representative resistor, referred to as resistors 162-168, respectively. However, more or fewer resistors may be utilized in each tier.

In this example, resistors 162-168 may each have a different resistance value (e.g., measured in Ohms). For example, resistor 162 may have a lower resistance than resistor 164, which may have a lower resistance than resistor 166, which may in turn have a lower resistance than resistor 168. Accordingly, tiers 154-160 may be arranged in order of decreasing resistance from top to bottom.

Each tier of resistive tiers 154-160 may be connected to a respective visual element, 170-176 (also referred to as a visual indicator and/or visual indicator element). These elements are referred to collectively as an array 178 of visual elements 170-176. In this example, each visual element is configured to change its visual state gradually and persistently. For example, a visual element may change from an extreme light to an extreme dark as electrical energy is dumped into the element. Transformation to the extreme dark state may be achieved after a certain cumulative amount of electrical energy is received by the element.

When DC signal 152 is received by processing bank 150, all visual elements 170-176 experience some level of state change (e.g., damage or degradation). However, due to the descending resistance values in the tiers, lower visual elements will experience more energy and change visual state more than higher elements. There is less current flow through the upper indicators due to higher resistance values. Subsequent DC signals 152 will have similar effects on the visual elements, depending on signal strength and/or duration.

Due to the staggered resistance values of the tiers, lower visual indicators will progress from light to dark (for example) after fewer exposures than upper visual indicators. For example, to completely transition between extremes of visual states, element 172 may require three times the amount of cumulative input energy (in the form of DC signal 152) as does element 170. Similar relationships may exist between the remaining elements, with differences being determined by the selected resistance values of the various tiers. The staggered resistor network allows signals to interact with all visual indicators to varying degrees, resulting in indication of the cumulative exposure. A very low amplitude signal for a very long duration will saturate the entire visual exposure band just as a shorter, high-intensity signal.

DC processing bank 150 and the corresponding array 178 of visual elements 170-176 are associated with a single component frequency band. Accordingly, array 178 will display the cumulative amount of exposure in that frequency band. Additional DC processing banks and corresponding visual arrays may be used to show the effects on multiple frequency bands. Each visual array of a plurality of such visual arrays may include any suitable number of visual elements. Likewise, any suitable number of visual arrays may be included in an overall display.

FIG. 5 is an illustrative human readable interface or visual display portion 200 suitable for use in a cumulative vibration monitoring system such as the one just described. Visual display portion 200 includes a matrix of sixteen visual arrays 202 each having fourteen visual elements or indicators 204. Other embodiments may include more or fewer arrays and/or indicators. Each visual array 202 is an example of visual array 178 described above.

In the embodiment depicted in FIG. 5, each visual array 202 is arranged as a vertical line of indicators 204. Each visual array 202 is associated with a different component frequency range or "bucket." Labels indicating the component frequency ranges are disposed on display portion 200 below each of the vertical arrays. For example, a selected visual array 206 is shown in dashed outline. Selected visual array 206 may represent any given frequency range. In this example, selected visual array 206 represents or corresponds to a range of 300 to 500 Hz. Cumulative exposure in that frequency range is indicated by the number of changed indicators and/or degree of state change in indicators of the array. In this example, nine indicators 204 in selected visual array 206 have changed state, indicating that approximately one thousand cycles have been experienced in the 300-500 Hz range. Ranges and/or cycle counts may be approximate, and may be based on selected characteristics of the DC processing blocks and/or the band pass filters.

With continuing reference to FIG. 5, visual display portion 200 may comprise a portion of an overall vibration monitoring system 208. System 208 may be substantially similar to system 40, described above. Accordingly, a sensor (e.g., a piezoelectric wafer) and processing circuit may be embedded in a substrate 210. Display portion 200 is an outward-facing, human-readable interface on a surface of substrate 210. In some examples, system 208 may comprise a sticker or tag attachable to a host piece of equipment for vibration monitoring. With system 208 attached to the host, a technician or other user can easily monitor the cumulative vibration to which the host equipment has been subjected. This information can then be tracked and/or compared to expected vibration. Expected equipment lifetime can then be updated over time, for example, by comparing actual accumulated vibration to expected vibration. For example, an electronic device may be expected to function adequately for a total lifetime corresponding to a certain number of cycles at one or more frequencies. At the design stage, the actual amount of time to accumulate that number of cycles must be estimated. Systems such as system 208 allow a user to determine the actual percentage of total cycles that have been accumulated by the host device, thereby enabling more accurate and ongoing estimates of remaining life.

Figure 7:
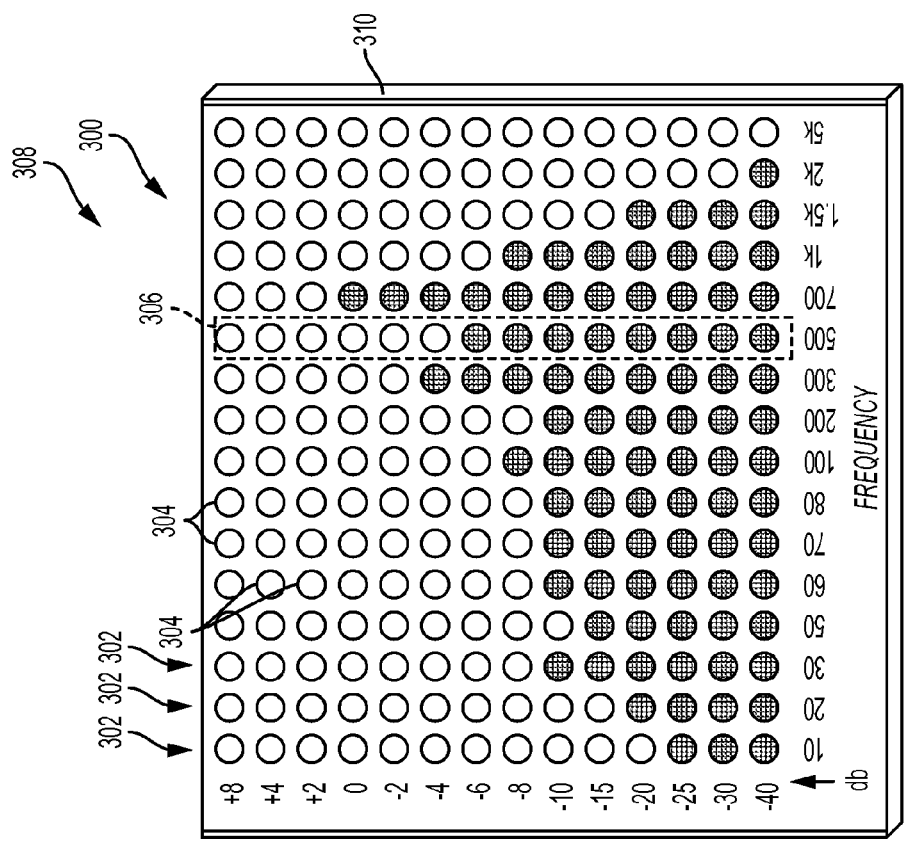
FIG. 7 depicts an illustrative human readable interface suitable for use in a peak vibration monitoring system in accordance with aspects of the present disclosure.
Figure 6:
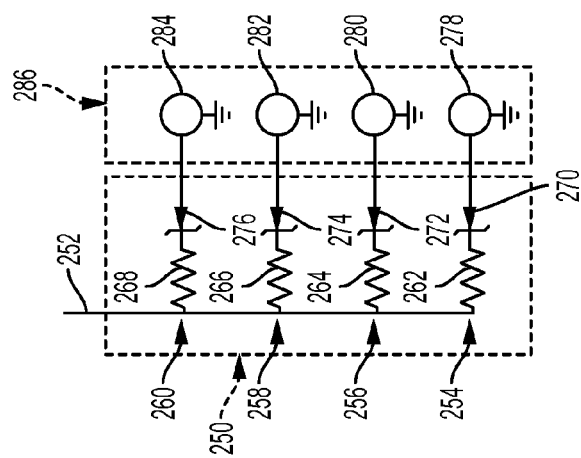
FIG. 6 is a circuit diagram showing an illustrative resistor, diode, and indicator arrangement suitable for use in a peak vibration monitoring system in accordance with aspects of the present disclosure.

Section 4:

As shown in FIGS. 6-7, this section describes components and subsystems suitable for use in a "peak level" version of a passive vibration monitoring system, such as system 20 and/or system 40. DC processing bank 250 is an embodiment of one or more components of DC processing portion 78 and visual display portion 96, described above. Similarly, visual display portion 300 is an embodiment of visual display portion 96, described above. Accordingly, similar components may be labeled with similar reference numbers.

FIG. 6 is a circuit diagram showing an illustrative resistor, diode, and indicator arrangement suitable for use in a peak vibration monitoring system. DC processing bank 250 includes any suitable arrangement or network of components configured to receive a DC signal 252 from a filtering portion (e.g., filtering portion 50) and to produce an array of output energies. The array of output energies is configured to produce a persistent change in the visual state of a connected array of indicator elements, the persistent change corresponding to a peak sensed vibration.

A system including DC processing bank 250 is therefore configured to display the peak vibrational energy experienced by the host equipment being monitored. To achieve this functionality, DC processing bank 250 includes a network of resistive tiers, each tier having a threshold below which no current will flow. In the illustrative example depicted in FIG. 5, four such tiers (254-260) are organized in parallel to each other. Other suitable arrangements and networks of components may be used to produce a similar effect.

Each resistive tier includes one or more resistive elements (e.g., resistors). In the example depicted in FIG. 5, each tier is shown having a single representative resistor, referred to as resistors 262-268, respectively. However, more or fewer resistors may be utilized in each tier.

As in the previous example, resistors 262-268 may each have a different resistance value (e.g., measured in Ohms). For example, resistor 262 may have a lower resistance than resistor 264, which may have a lower resistance than resistor 266, which may in turn have a lower resistance than resistor 268. Accordingly, tiers 254-260 may be arranged in order of decreasing resistance from top to bottom.

In addition to, and in series with, the resistive elements, each tier also includes a Zener diode or the equivalent. Zener diodes 270-276 each includes any component or components configured to prevent current flow in a respective tier unless voltage is above a selected threshold (e.g., the breakdown voltage of the Zener diode). Accordingly, current will not flow in any given one of tiers 254-260 unless the voltage (as reduced by the corresponding resistor) is above the threshold.

Each tier of resistive tiers 254-260 may be connected to a respective visual element, 278-284 (also referred to as a visual indicator and/or visual indicator element). These elements are referred to collectively as an array of visual elements 286. In this example, each visual element may be configured to change its visual state in a binary fashion. For example, a visual element may change from an extreme light to an extreme dark whenever electrical energy is dumped into the element. Essentially immediate transformation to the extreme dark state may be achieved when a certain amount of electrical energy is received by the element. This amount of electrical energy may be greater than a threshold amount based on the properties of the visual element. In some embodiments, the visual elements may be of the gradual type described in a previous example. In those embodiments, an effectively binary state change may nonetheless be produced by ensuring that the voltage at the visual element is either effectively zero or high enough to achieve complete visual state change.

When DC signal 252 is received by processing bank 250, all tiers 254-260 experience an input voltage. Due to the descending resistance values in the tiers, a larger voltage will be present at the Zener diodes of lower tiers. No voltage will be passed to the associated visual element of any tier unless the voltage is greater than the Zener breakdown level. Accordingly, the Zener diode threshold will discretize the signals present at the visual elements. Small input signals will be blocked, while larger signals will be essentially unimpeded. Subsequent DC signals 252 will have similar effects on the visual elements, depending on signal strength. Visual elements that have already changed state will remain in the "on" or "activated" state. If the signal is high enough to effect a previously unaltered visual element, that element will also change state. This allows visual array 286 to depict the greatest amplitude of vibration sensed by the system.

Due to the staggered resistance values of the tiers, lower visual indicators will change state at smaller values of DC signal 252 than upper visual indicators. For example, element 280 may change state at a signal equivalent to −30 decibels, while element 278 changes state at a signal equivalent to −40 decibels. Similar relationships may exist between the remaining elements, with differences being determined by the selected resistance values of the various tiers.

DC processing bank 250 and the corresponding array of visual elements 286 are associated with a single component frequency band. Accordingly, array 286 will display the peak amount of exposure in that frequency band. Additional DC processing banks and corresponding visual arrays may be used to show the effects on multiple frequency bands. Each visual array of a plurality of such visual arrays may include any suitable number of visual elements. Likewise, any suitable number of visual arrays may be included in an overall display.

FIG. 7 is an illustrative human readable interface or visual display portion 300 suitable for use in a peak vibration monitoring system such as the one just described. Visual display portion 300 includes a matrix of sixteen visual arrays 302 each having fourteen visual elements or indicators 304. Other embodiments may include more or fewer arrays and/or indicators. Each visual array 302 is an example of visual array 286 described above.

In the embodiment depicted in FIG. 7, each visual array 302 is arranged as a vertical line of indicators 304. Each visual array 302 is associated with a different component frequency range or "bucket." Labels indicating the component frequency ranges are disposed on display portion 300 below each of the vertical arrays. For example, a selected visual array 306 is shown in dashed outline. Selected visual array 306 may represent any given frequency range. In this example, selected visual array 306 represents or corresponds to a range of 500 to 700 Hz. Peak exposure in that frequency range is indicated by the number of indicators of the array that have changed state. In this example, eight indicators 304 in selected visual array 306 have changed state, indicating that vibrations up to approximately −6 db in strength have been experienced in the 500-700 Hz range. Ranges and/or peak values may be approximate, and may be based on selected characteristics of the DC processing blocks and/or the band pass filters.

With continuing reference to FIG. 7, visual display portion 300 may comprise a portion of an overall vibration monitoring system 308. System 308 may be substantially similar to system 40, described above. Accordingly, a sensor (e.g., a piezoelectric wafer) and processing circuit may be embedded in a substrate 310. Display portion 300 is an outward-facing, human-readable interface on a surface of substrate 310. In some examples, system 308 may comprise a sticker or tag attachable to a host piece of equipment for vibration monitoring. With system 308 attached to the host, a technician or other user can easily monitor the peak vibration to which the host equipment has been subjected. This information can then be tracked and/or compared to expected peak levels of vibration. Higher levels of peak vibration may indicate possible equipment damage or degradation. Accordingly, additional monitoring, testing, or replacement of the host equipment may be performed when peak levels exceed expected or desired limits.

Figure 9:
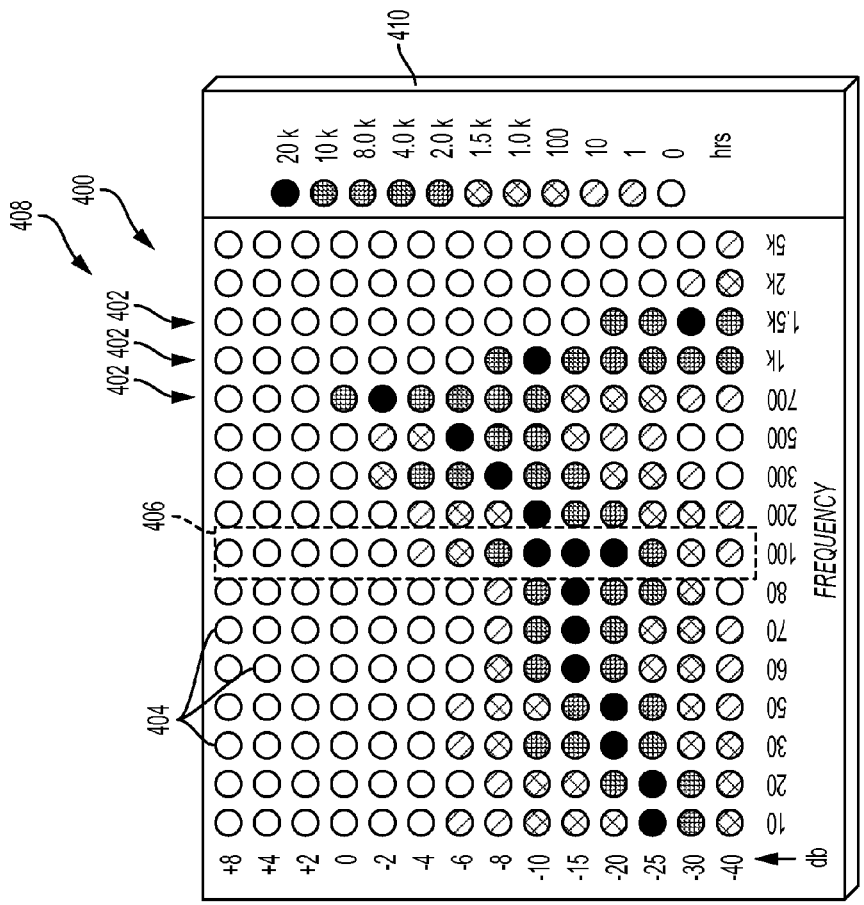
FIG. 9 depicts an illustrative human readable interface suitable for use in an exposure-level vibration monitoring system in accordance with aspects of the present disclosure.
Figure 8:
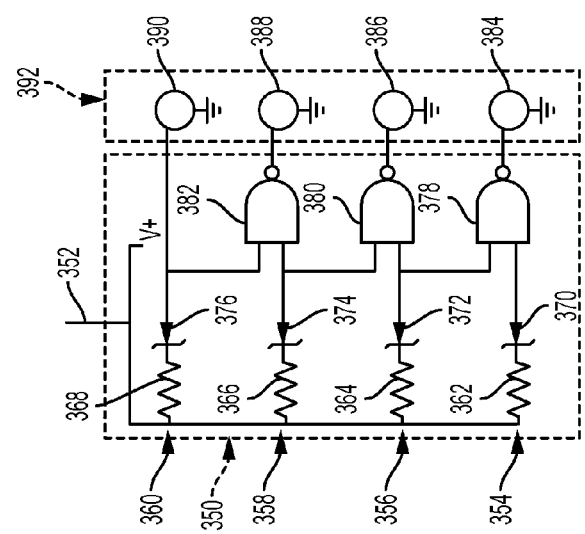
FIG. 8 is a circuit diagram showing an illustrative resistor, diode, logic gate, and indicator arrangement suitable for use in an exposure-level vibration monitoring system in accordance with aspects of the present disclosure.

Section 5:

As shown in FIGS. 8-9, this section describes components and subsystems suitable for use in an "exposure level" version of a passive vibration monitoring system, such as system 20 and/or system 40. DC processing bank 350 is an embodiment of one or more components of DC processing portion 78 and visual display portion 96, described above. Similarly, visual display portion 400 is an embodiment of visual display portion 96, described above. Accordingly, similar components may be labeled with similar reference numbers.

FIG. 8 is a circuit diagram showing an illustrative resistor, diode, logic gate, and indicator arrangement suitable for use in an exposure level monitoring system. DC processing bank 350 includes any suitable arrangement or network of components configured to receive a DC signal 352 from a filtering portion (e.g., filtering portion 50) and to produce an array of output energies. The array of output energies is configured to produce a persistent change in the visual state of a connected array of indicator elements, the persistent change corresponding to a granular exposure level. For example, the persistent change may correspond to a duration, level, and frequency range of exposure to vibration. Accordingly, this version of passive vibration monitoring system may be referred to as a three-dimensional system (i.e., time, level, and frequency).

A system including DC processing bank 350 is configured to display three aspects of the vibrational energy experienced by the host equipment. To achieve this functionality, DC processing bank 350 includes a network of logically interdependent, resistive tiers, each tier having a threshold below which no current will flow. In the illustrative example depicted in FIG. 8, four such tiers (354-360) are organized in parallel to each other. Other suitable arrangements and networks of components may be used to produce a similar effect.

Each resistive tier includes one or more resistive elements (e.g., resistors). In the example depicted in FIG. 8, each tier is shown having a single representative resistor, referred to as resistors 362-368, respectively. However, more or fewer resistors may be utilized in each tier.

As in the previous examples, resistors 362-368 may each have a different resistance value (e.g., measured in Ohms). For example, resistor 362 may have a lower resistance than resistor 364, which may have a lower resistance than resistor 366, which may in turn have a lower resistance than resistor 368. Accordingly, tiers 354-360 may be arranged in order of decreasing resistance from top to bottom.

In addition to, and in series with, the resistive elements, each tier also includes a Zener diode or the equivalent. Zener diodes 370-376 each includes any component or components configured to prevent current flow in a respective tier unless voltage is above a selected threshold (e.g., the breakdown voltage of the Zener diode). As in the previous example, current will not flow in any given one of tiers 354-360 unless the voltage (as reduced by the corresponding resistor) is above the threshold.

DC processing bank 350 also includes a plurality of NAND gates (378-382), with one NAND gate connecting each tier to the one immediately below it, as shown in FIG. 8. Each NAND gate includes any suitable component having two inputs and one output, the component being configured to produce an output unless both of the inputs are "high" or "on." Accordingly, a signal exceeding the threshold of Zener 370 will produce an output in tier 354 unless the signal in tier 356 exceeds Zener 372. Similar results exist in succeeding tiers. The net effect is that, given an input signal 352 that results in a voltage exceeding the Zener threshold of more than one tier, only the tier having the greatest resistance value will produce an output. In other words, if the strength of signal 352 is such that all four tiers would otherwise produce an output, only tier 360 will do so. Likewise, if the strength of signal 352 is such that bottom tiers 354 and 356 would otherwise produce an output, only tier 356 will do so.

Each tier of resistive tiers 354-360 may be connected to a respective visual element, 384-390 (also referred to as a visual indicator and/or visual indicator element). These elements are referred to collectively as an array of visual elements 392. In this example, each visual element is configured to change its visual state gradually and persistently. For example, a visual element may change from an extreme light to an extreme dark as electrical energy is dumped into the element. Transformation to the extreme dark state may be achieved after a certain cumulative amount of electrical energy is received by the element.

When DC signal 352 is received by processing bank 350, all tiers 354-360 experience an input voltage. Due to the descending resistance values in the tiers, a larger voltage will be present at the Zener diodes of lower tiers. No voltage will be passed to the associated visual element of any tier unless the voltage is greater than the Zener breakdown level. Accordingly, the Zener diode threshold will discretize the signals present at the NAND gates. Small input signals will be blocked, while larger signals will be essentially unimpeded. As described above, the NAND gates will function to selectively allow only the highest signal to proceed to visual array 392. Accordingly, only one element of visual array 392 will be affected (i.e., visually altered) at a time. Subsequent DC signals 352 will be processed similarly, with a single visual element being affected depending on signal strength and/or duration. This allows visual array 392 to depict the level and duration of vibration sensed by the system.

DC processing bank 350 and the corresponding array of visual elements 392 are associated with a single component frequency band. Accordingly, array 392 will display the cumulative amount of exposure at a given level, in that frequency band. Additional DC processing banks and corresponding visual arrays may be used to show the effects on multiple frequency bands. Each visual array of a plurality of such visual arrays may include any suitable number of visual elements. Likewise, any suitable number of visual arrays may be included in an overall display.

FIG. 9 is an illustrative human readable interface or visual display portion 400 suitable for use in an exposure level vibration monitoring system such as the one just described. Visual display portion 400 includes a matrix of sixteen visual arrays 402 each having fourteen visual elements or indicators 404. Other embodiments may include more or fewer arrays and/or indicators. Each visual array 402 is an example of visual array 392 described above.

In the embodiment depicted in FIG. 9, each visual array 402 is arranged as a vertical line of indicators 404. Each visual array 402 is associated with a different component frequency range or "bucket." Labels indicating the component frequency ranges are disposed on display portion 400 below each of the vertical arrays. For example, a selected visual array 406 is shown in dashed outline. Selected visual array 406 may represent any given frequency range. In this example, selected visual array 406 represents or corresponds to a range of 100 to 200 Hz. Exposure levels in that frequency range are indicated by the state of each of the indicators in selected visual array 406. Intensity or degree of state change corresponds to cumulative exposure, while individual elements correspond to different levels (e.g., decibel levels). In this example, nine indicators 404 in array 406 have changed state to varying degrees. For example, based on the complete visual state change of the fourth, fifth, and sixth indicators up from the bottom of the display, levels of −20 db, −15 db, and −10 db have been experienced for at least 20,000 hours. In FIG. 9, a legend is provided to the right of the display. Similarly, based on the partial change in visual state of first three indicators at the bottom of the display, levels of −40 db, −30 db, and −25 db have been experienced for approximately one to 1,000 hours. Ranges, peak values, and/or durations may be approximate, and may be based on selected characteristics of the DC processing blocks and/or the band pass filters.

With continuing reference to FIG. 9, visual display portion 400 may comprise a portion of an overall vibration monitoring system 408. System 408 may be substantially similar to system 40, described above. Accordingly, a sensor (e.g., a piezoelectric wafer) and processing circuit may be embedded in a substrate 410. Display portion 400 is an outward-facing, human-readable interface on a surface of substrate 410. In some examples, system 408 may comprise a sticker or tag attachable to a host piece of equipment for vibration monitoring. With system 408 attached to the host, a technician or other user can easily monitor the duration and intensity experienced by the host equipment at any given level and frequency range. This information can then be tracked and/or compared to expected levels. Higher levels of peak vibration and/or higher durations may indicate possible equipment damage or degradation. Accordingly, additional monitoring, testing, or replacement of the host equipment may be performed when peak levels and/or durations exceed expected or desired limits. Similarly, equipment lifetime can be monitored based on durations and levels of vibration.

Figure 10:
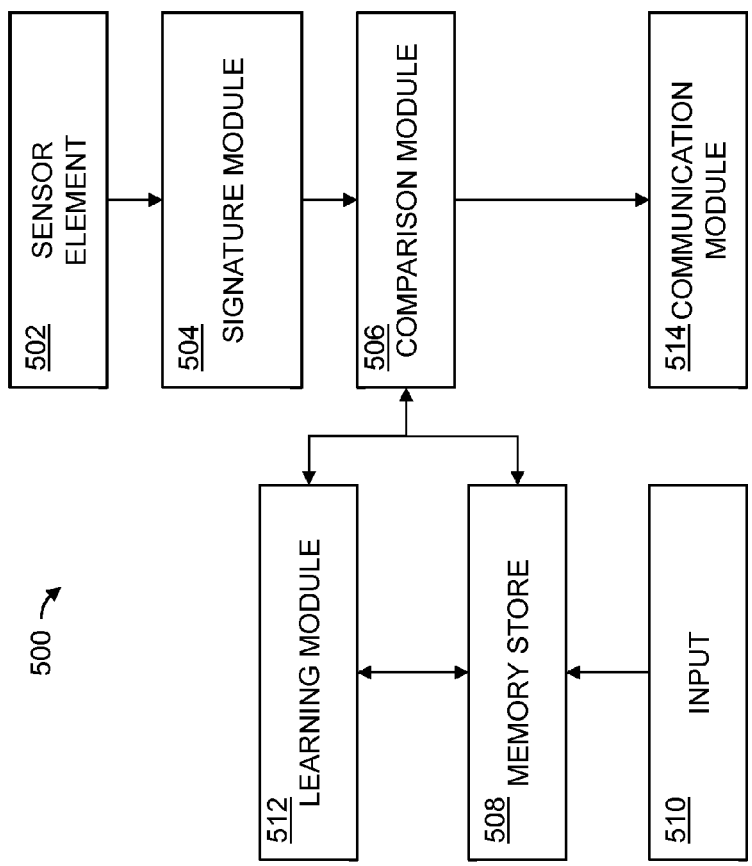
FIG. 10 is a schematic diagram of an illustrative vibration monitoring system configured to identify events and/or failure modes based on vibration patterns.

Section 6:

As shown in FIG. 10, this section describes a powered type of vibration monitoring system, generally indicated at 500. System 500 is an example of system 10, described above. Accordingly, similar components may be labeled with similar reference numbers.

FIG. 10 is a schematic block diagram showing selected components of a vibration monitoring system configured to identify events and/or failure modes based on vibration patterns. System 500 includes a sensor 502, which may include any suitable transducer configured to convert oscillational energy into an electrical signal having a waveform. For example, sensor 502 may include a piezoelectric element (substantially as described above), an accelerometer, a microphone, and/or the like, or any combination of these.

The output of sensor 502 is communicated to a signature module 504, which includes any suitable components, modules, hardware, and/or software configured to process and analyze the electrical signal of sensor 500. For example, signature module 504 may include an analog to digital converter. In some embodiments, signature module 504 may include an analysis portion configured to generate one or more fingerprints based on spectrograms corresponding to the waveform produced by sensor 502. Suitable methods for producing such fingerprints are disclosed in U.S. Pat. No. 6,990,453, which is hereby incorporated herein, in its entirety, for all purposes. For example, one or more landmarks may be established at one or more spaced apart times in the duration of the signal. At each landmark, one or more characteristics of the spectrogram of the waveform may be determined and numerically encoded. Each numerically encoded set of characteristics may comprise a fingerprint, pattern, or substantially identifying signature of the waveform. Additionally or alternatively, processor module 504 may generate or produce a Fourier transform (FT) of the signal (e.g., using a fast Fourier transform (FFT) method). Any suitable method may be utilized to produce a representation of the frequency domain of the signal.

Signature module 504 communicates the resulting identifying and/or descriptive analysis of the waveform to a comparison module 506 which is in communication with a memory store 508. Comparison module 506 may include any suitable software and/or hardware module(s) configured to identify occurrences of known events by comparing the fingerprint (i.e., a pattern of features of the generated spectrogram) to a plurality of known fingerprints (i.e., spectrogram feature patterns) stored in memory store 508. Alternatively or additionally, comparison module 506 may be configured to identify possible equipment failures by comparing the generated FT to an expected FT, such as by using established failure identification rules.

Memory store 508 may be local or remote, and may include so-called cloud storage. Further explanation of memory stores in general is included below (see Section 7). An input 510 to memory store 508 may be provided, such that a user or other system may place new or modified patterns and/or rules in memory store 508. A learning module 512 may be included, which may function to recognize new patterns or rules, either automatically, with user input, or a combination of the two. Learning module 512 may, for example, recognize patterns that are not present in the memory store. Such unrecognized patterns may be brought to the user's attention for further description or investigation. New patterns and associated identifying information may be placed into the memory store as a result. In some embodiments, a learning algorithm may be utilized to expose the system to various instances of the new pattern and to determine the range of pattern variation that may be expected.

An output of comparison module 506 may be passed to a communication module 514. Communication module 514 may include any suitable components configured to communicate information regarding comparison results to a user or to an interfaced system. For example, communication module 514 may include a human-readable interface, a graphical user interface (GUI), an alert system, a textual and/or iconic display, an alarm, and/or the like, or any combination of these. Communication module 514 may include processing capabilities, such as determination of deviation from normal parameters.

One or more modules or other components of system 500 may be implemented as instructions executed by a computer processor. Additional features and embodiments of system 500 are described in further detail below.

Figure 11:
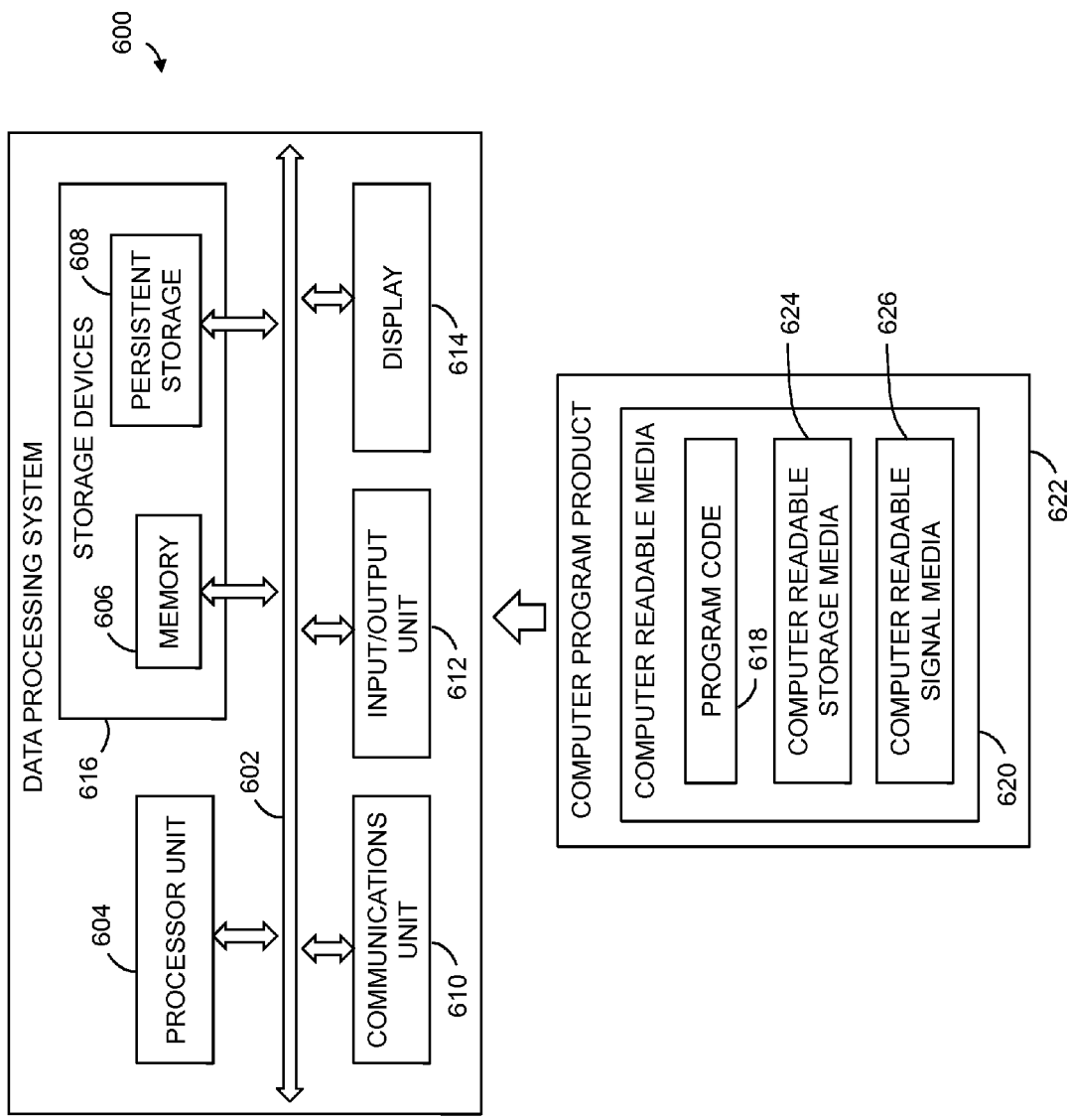
FIG. 11 is a schematic diagram of various components of an illustrative data processing system suitable for use with aspects of the present disclosure.

Section 7:

As shown in FIG. 11, this example describes a data processing system 600, also referred to as a computer, in accordance with aspects of the present disclosure. In this example, data processing system 600 is an illustrative data processing system suitable for implementing aspects of vibration monitoring system 500. More specifically, in some examples, devices that are embodiments of data processing systems (e.g., smartphones, tablets, personal computers) may execute instructions to implement some or all of signature module 504, comparison module 506, and/or communication module 514. Various components and systems described in this section may store information used by system 500, e.g., by comparison module 506.

In this illustrative example, data processing system 600 includes communications framework 602. Communications framework 602 provides communications between processor unit 604, memory 606, persistent storage 608, communications unit 610, input/output (I/O) unit 612, and display 614. Memory 606, persistent storage 608, communications unit 610, input/output (I/O) unit 612, and display 614 are examples of resources accessible by processor unit 604 via communications framework 602.

Processor unit 604 serves to run instructions that may be loaded into memory 606. Processor unit 604 may be a number of processors, a multi-processor core, or some other type of processor, depending on the particular implementation. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and other suitable information either on a temporary basis or a permanent basis.

Storage devices 616 also may be referred to as computer-readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output (I/O) unit 612 allows for input and output of data with other devices that may be connected to data processing system 600. For example, input/output (I/O) unit 612 may provide a connection for user input through a keyboard, a mouse, and/or some other suitable input device. Further, input/output (I/O) unit 612 may send output to a printer. Display 614 provides a mechanism to display information to a user.

Instructions for the operating system, applications, and/or programs may be located in storage devices 616, which are in communication with processor unit 604 through communications framework 602. In these illustrative examples, the instructions are in a functional form on persistent storage 608. These instructions may be loaded into memory 606 for execution by processor unit 604. The processes of the different embodiments may be performed by processor unit 604 using computer-implemented instructions, which may be located in a memory, such as memory 606.

These instructions are referred to as program instructions, program code, computer usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these examples. In one example, computer-readable media 620 may be computer-readable storage media 624 or computer-readable signal media 626.

Computer-readable storage media 624 may include, for example, an optical or magnetic disk that is inserted or placed into a drive or other device that is part of persistent storage 608 for transfer onto a storage device, such as a hard drive, that is part of persistent storage 608. Computer-readable storage media 624 also may take the form of a persistent storage, such as a hard drive, a thumb drive, or a flash memory, that is connected to data processing system 600. In some instances, computer-readable storage media 624 may not be removable from data processing system 600.

In these examples, computer-readable storage media 624 is a physical or tangible storage device used to store program code 618 rather than a medium that propagates or transmits program code 618. Computer-readable storage media 624 is also referred to as a computer-readable tangible storage device or a computer-readable physical storage device. In other words, computer-readable storage media 624 is a media that can be touched by a person.

Alternatively, program code 618 may be transferred to data processing system 600 using computer-readable signal media 626. Computer-readable signal media 626 may be, for example, a propagated data signal containing program code 618. For example, computer-readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer-readable signal media 626 for use within data processing system 600. For instance, program code stored in a computer-readable storage medium in a server data processing system may be downloaded over a network from the server to data processing system 600. The data processing system providing program code 618 may be a server computer, a client computer, or some other device capable of storing and transmitting program code 618.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 600. Other components shown in FIG. 11 can be varied from the illustrative examples shown. The different embodiments may be implemented using any hardware device or system capable of running program code. As one example, data processing system 600 may include organic components integrated with inorganic components and/or may be comprised entirely of organic components excluding a human being. For example, a storage device may be comprised of an organic semiconductor.

In another illustrative example, processor unit 604 may take the form of a hardware unit that has circuits that are manufactured or configured for a particular use. This type of hardware may perform operations without needing program code to be loaded into a memory from a storage device to be configured to perform the operations.

For example, when processor unit 604 takes the form of a hardware unit, processor unit 604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 618 may be omitted, because the processes for the different embodiments are implemented in a hardware unit.

In still another illustrative example, processor unit 604 may be implemented using a combination of processors found in computers and hardware units. Processor unit 604 may have a number of hardware units and a number of processors that are configured to run program code 618. With this depicted example, some of the processes may be implemented in the number of hardware units, while other processes may be implemented in the number of processors.

In another example, a bus system may be used to implement communications framework 602 and may be comprised of one or more buses, such as a system bus or an input/output bus. Of course, the bus system may be implemented using any suitable type of architecture that provides for a transfer of data between different components or devices attached to the bus system.

Additionally, communications unit 610 may include a number of devices that transmit data, receive data, or both transmit and receive data. Communications unit 610 may be, for example, a modem or a network adapter, two network adapters, or some combination thereof. Further, a memory may be, for example, memory 606, or a cache, such as that found in an interface and memory controller hub that may be present in communications framework 602.

The block diagram described herein illustrates the architecture, functionality, and operation of possible implementations of systems, methods, and computer program products according to various illustrative embodiments.

Figure 12:
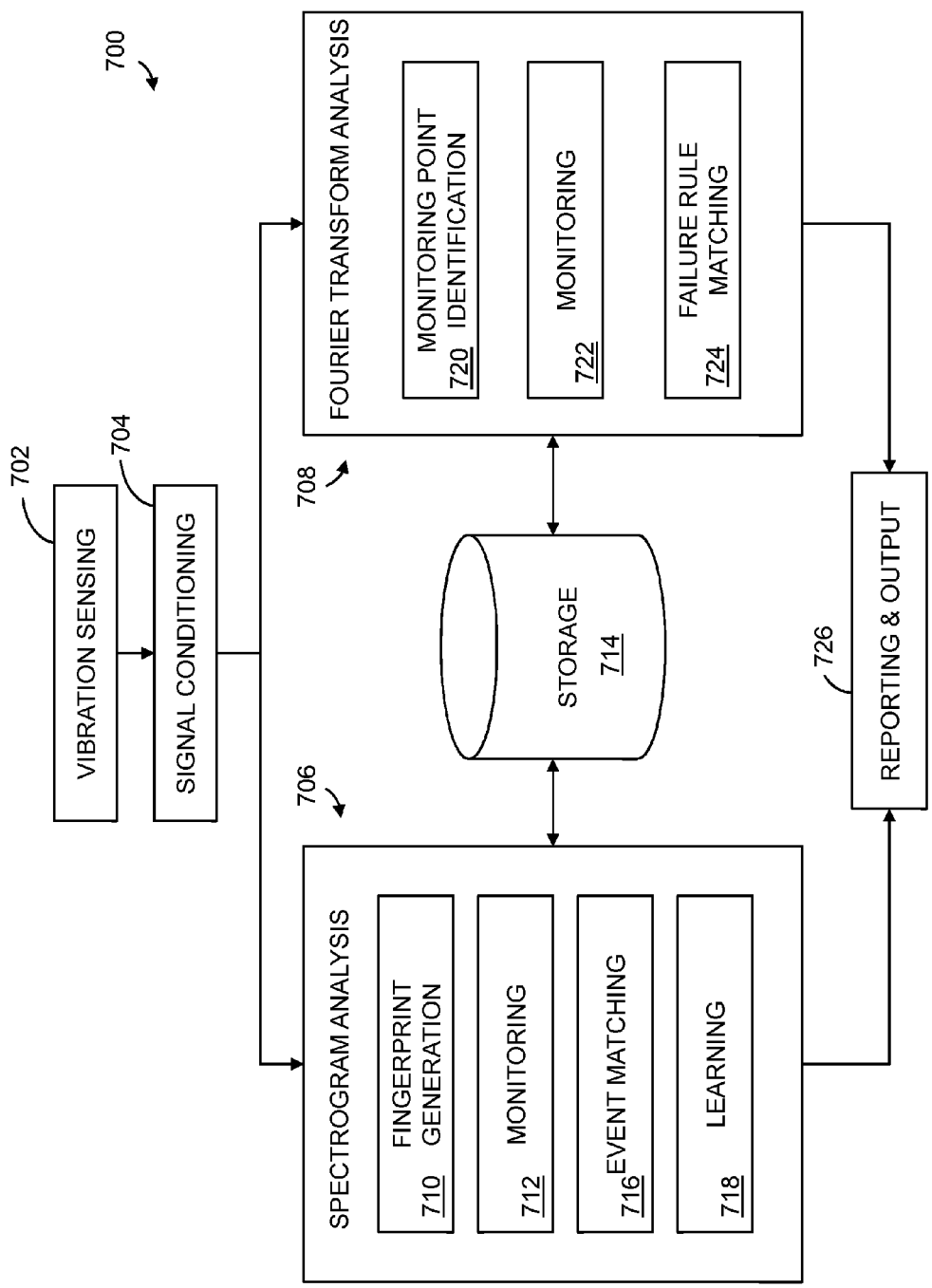
FIG. 12 is a schematic diagram of an illustrative embodiment of the system of FIG. 10.

Section 8:

As shown in FIG. 12, this section describes a vibration monitoring system 700 configured to identify events and/or failure modes based on vibration patterns. System 700 is an example of system 500, described above. Accordingly, similar components may be labeled with similar reference numbers.

FIG. 12 is a schematic diagram showing various modules and functions of vibration monitoring system 700.

System 700 includes a vibration sensing transducer 702, substantially as described above regarding system 500. Transducer 702 may be a single sensor or may comprise multiple sensors. Transducer 702 may be mounted or otherwise disposed in a location such that sound and/or other vibration from multiple devices and pieces of equipment may be sensed at the transducer. For example, an aircraft may be monitored by a transducer mounted near a midpoint of the fuselage. In other examples, a factory, room, or enclosed space containing equipment may be monitored by a transducer placed at or near a wall or ceiling. In some examples, multiple systems 700 may be used, each with a corresponding transducer 702 disposed in a separate space to be monitored. In some examples, multiple transducers 702 may feed into one analysis portion of system 700.

The alternating current produced by transducer 702 is communicated to a signal conditioning module 704. Module 704 may include any suitable hardware and/or software configured to condition the signal for further analysis. For example, signal conditioning module 704 may include an analog to digital (ND) converter, one or more amplifiers, one or more filters, and/or the like, or any combination of these.

The conditioned digital signal is then communicated to a stage corresponding to the signature and comparison modules (504 and 506) described above. More specifically, the conditioned digital signal is communicated to a spectrogram analysis module 706 and to a Fourier transform (FT) analysis module 708.

Spectrogram analysis module 706 is configured to generate spectrograms corresponding to the incoming signal. A fingerprint module 710 generates fingerprints of the signal. These fingerprints may be described as numerically encoded patterns of characteristics describing the signal. The fingerprints may also be described as spectrogram feature patterns. A spectrogram may include a plot of frequency over time, with signal amplitude being indicated by intensity or color of each data point. Characteristics may include where higher intensity points are at any given time, and/or where such higher intensities occur consistently or persistently over time. For example, a centrifugal pump running at steady state may produce a relatively consistent spectrogram. Similarly, the same centrifugal pump may have a distinctive spectrogram during a start-up phase.

Spectrogram analysis module 706 may further include a monitoring function 712, wherein spectrograms and fingerprints are continually or continuously generated. This function may include storage of some buffered number of spectrograms, e.g., corresponding to a selected length of time. This and other features may utilize a central, distributed, and/or local memory store 714.

Spectrogram analysis module 706 includes an event matching portion 716. Event matching portion 716 may include any suitable circuits, modules, and/or software configured to compare the fingerprints generated from the sensor signal to known fingerprints and/or patterns stored in memory store 714. In other words, using event matching portion 716, module 706 may identify an instance of a known event based on a comparison of the sensed vibration fingerprint to a stored vibration pattern. For example, instances of the previously mentioned centrifugal pump going through a start-up phase may be recognized by system 700. Such instances may be communicated to the user and/or a count of the instances may be maintained. Other events may be monitored, such as door closes, equipment startup and shutdown, lavatory flushes, engine cycles, etc.

As described above in Section 6, spectrogram analysis module 706 may include a learning component 718. Learning component 718 may include any suitable circuits, modules, and/or software configured to establish or modify known patterns for later recognition by the system. For example, a user may load known patterns into memory store 714 via learning component 718. Additionally or alternatively, learning component 718 may monitor to establish empirical variations in a known pattern for better recognition and/or fewer false positives.

FT analysis module 708 may include modules, circuits, and/or software configured to continually generate Fourier transforms corresponding to the incoming signal. This FT generation may be achieved by any standard method, such as the fast Fourier transform (FFT) algorithm. The FT generation may be performed in parallel with the spectrogram generation of module 706. In some embodiments, one or both of modules 706 and 708 may be enabled. In other words, each module may be in operation at different times, simultaneously, and/or for different uses. The remainder of this description assumes simultaneous operation of the two modules in parallel.

FT analysis module 708 includes a monitoring point identification module 720. Monitoring point identification module 720 may include any circuits, modules, and/or software configured to identify distinctive frequencies within the FT of the signal. For example, frequencies corresponding to higher amplitudes may be selected. For example, frequencies that are multiples of other identified frequencies may be selected for monitoring.

FT analysis module 708 may include a monitoring function 722, which may include any suitable portion of the system configured to keep track of the monitoring points established by the monitoring point identification module. For example, monitoring function 722 may store a buffer of time-based FTs in memory store 714, and may monitor for new signal components at certain frequencies, drift of existing peaks, harmonics, etc. Root mean squared (RMS) calculations may be performed to determine an overall state of the signal. Changes in RMS values may indicate a meaningful change in the signal.

A failure rule matching module 724 may be configured to compare the patterns and characteristics of the FTs generated by the system to known rules and guidelines. For example, vibrations related to operational and failure modes for machinery are quantitatively described in references such as "Basic Machinery Vibrations: An introduction to machine testing, analysis, and monitoring," by Ronald L. Eshleman (1999), the entirety of which is incorporated herein for all purposes.

Failure indications (i.e., rules) such as the ones described by Eshleman are stored in memory store 714 and utilized by failure rule matching module 724 to identify signs of failure or degradation in the system. For example, a motor may normally rotate at a certain speed, with a corresponding spectral frequency. If a new frequency is observed at twice the normal frequency, this may indicate a misalignment of the motor shaft. New or modified rules and variables may be stored in memory store 714 by any suitable method known in the art.

Accordingly, spectrogram analysis module 706 may function to identify occurrences of known events, and FT analysis module may function to identify indications of known machinery failures or degradation. Together, these modules may provide valuable information regarding system operation. Such information may be communicated to a user or other system by a reporting and output module 726. Reporting and output module 726 may provide compiled data, graphical displays, audible alerts, textual indicators, and/or the like, or any combination of these.

In general, an equipment monitoring system, such as system 700 described above, may include a transducer configured to convert oscillational energy into an electrical signal having a waveform. A processor (also referred to as a processor unit) may be in communication with the transducer and with a memory store, the processor including a signature module configured to continually generate, based on the waveform, a spectrogram and a Fourier transform (FT). The processor may further include a comparison module in communication with the signature module, the comparison module being configured to identify occurrences of known events by comparing a pattern of features of the generated spectrogram to a plurality of known spectrogram feature patterns stored in the memory store, and to identify possible equipment failures by comparing the generated FT to an expected FT.

Aspects of vibration monitoring systems may be utilized in the method steps described below. Where appropriate, reference may be made to previously described components and systems that may be used in carrying out each step. These references are for illustration, and are not intended to limit the possible ways of carrying out any particular step of the method. The description below may not recite the complete process. Although various steps of the method are described below, the steps need not necessarily all be performed, and in some cases may be performed in a different order than the order described.

A method for monitoring a plurality of devices in a space may include sensing oscillational energy produced by a plurality of devices in a space. The sensed oscillational energy may be converted into an electrical signal having a waveform. A spectrogram and a Fourier transform (FT) may be continually generated, based on the waveform. An occurrence of a known event may be identified by comparing a pattern of features of the generated spectrogram to a plurality of known spectrogram feature patterns. Possible equipment failures may be identified by comparing the generated FT to an expected FT.

A user may be alerted to the occurrence of the known event.

Identifying possible equipment failures may include comparing the generated FT to the expected FT based on a set of selected failure rules.

A count of occurrences of the known event may be maintained.

A new spectrogram feature pattern may be added to the plurality of known spectrogram feature patterns.

Selected Embodiments

This section describes additional aspects and features of vibration monitoring systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A vibration indication system comprising a transducer configured to generate an alternating current in response to a sensed vibration, the alternating current having at least one component frequency; a processing circuit in communication with the transducer, the processing circuit configured to produce a first output when the component frequency falls within a first frequency range; an array of visual elements in communication with the processing circuit, the array being configured to change from a first persistent visual state to a second persistent visual state in response to the first output of the processing circuit.

A1. The system of paragraph A0, wherein the transducer comprises a piezoelectric sensor.

A2. The system of paragraph A0, the processing circuit further comprising a band pass filter.

A3. The system of paragraph A2, the processing circuit further comprising a network of resistive tiers configured to attenuate an output of the band pass filter, each of the resistive tiers having a different effective resistance value.

A4. The system of paragraph A3, wherein the network of resistive tiers comprises a plurality of parallel resistors arranged in series with the band pass filter, each of the resistors having a different resistance value.

A5. The system of paragraph A0, wherein the first output of the processing circuit has an amplitude corresponding to a strength of the alternating current.

A6. The system of paragraph A5, wherein the second persistent visual state corresponds to the amplitude of the first output.

A7. The system of paragraph A5, wherein a number of the visual elements, corresponding to the amplitude of the first output, change to the second persistent visual state to indicate a peak vibration level.

A8. the system of paragraph A7, wherein each element of the number of visual elements is configured to change to the second persistent visual state when a respective threshold is exceeded by the amplitude of the first output, to provide an indication of a peak vibration level for the first frequency range.

A9. The system of paragraph A0, the processing circuit further configured to produce a second output when the component frequency falls within a second frequency range.

A10. The system of paragraph A9, wherein the array of visual elements is further configured to change to a third persistent visual state in response to the third output of the processing circuit.

A11. The system of paragraph A0, wherein the transducer, the processing circuit, and the array of visual elements comprise a packaged unit configured to be attached to a monitored device.

A12. The system of paragraph A11, wherein the packaged unit comprises a layered sticker configured to be adhered to the monitored device.

B0. A sensor comprising a transducer configured to convert vibration into an electrical signal; a non-powered processor module electrically coupled to the transducer, the processor module being configured to produce a first output when the electrical signal has a frequency component in a first frequency range and to produce a second output when the electrical signal has a frequency component in a second frequency range; an array including a first visual indicator and a second visual indicator, the array being in communication with the processor module; wherein the first visual indicator is configured to change state persistently in response to a first instance of the first output, and the second visual indicator is configured to change state persistently in response to a first instance of the second output.

B1. The sensor of paragraph B0, the array further including a third visual indicator, wherein the third visual indicator is configured to change state persistently in response to a second instance of the first output.

B2. The sensor of paragraph B0, wherein the persistent state change of the first visual indicator corresponds to a magnitude of the first output.

B3. The sensor of paragraph B0, wherein the first and second visual indicators have two persistent visual states.

B4. The sensor of paragraph B0, wherein the first and second visual indicators have a continuous range of persistent visual states.

B5. The sensor of paragraph B4, wherein the first and second visual indicators comprise a thermochromatic material responsive to a voltage of the first output.

B6. The sensor of paragraph B0, wherein the sensor is configured to be mounted directly to a piece of equipment to be monitored for vibration.

C0. A method of monitoring a device for vibration exposure, the method comprising: sensing a vibration using an unpowered transducer coupled to a device being monitored; determining a frequency and amplitude of the sensed vibration using an electrical circuit in communication with the transducer, the circuit including a tiered plurality of band pass filters and powered only by an output of the transducer; visually displaying the frequency and amplitude information using a passive display.

C1. The method of paragraph C0, wherein sensing the vibration includes using a piezoelectric element.

C2. The method of paragraph C0, wherein the electrical circuit includes at least one set of tiered parallel resistive sub-circuits in series with the plurality of band pass filters.

C3. The method of paragraph C0, wherein visually displaying the frequency and amplitude information includes persistently changing the state of an array of visual indicators.

C4. The method of paragraph C3, wherein changing the state of the array includes persistently changing the state of at least one visual indicator designated to correspond to the frequency information.

C5. The method of paragraph C4, the at least one visual indicator including a number of visual indicators, wherein the number corresponds to the amplitude information.

C6. The method of paragraph C4, further including changing the at least one visual indicator by a selected amount corresponding to the amplitude information.

C7. The method of paragraph C0, wherein determining the amplitude of the sensed vibration includes passing at least a portion of the output of the transducer through a rectifier.

C8. The method of paragraph C0, further including mounting the transducer to the device being monitored.

D0. A method of monitoring a device for vibration exposure, the method comprising: converting a sensed vibration into an AC electrical signal using a transducer; splitting the AC electrical signal into a plurality of subsignals using a tiered plurality of band pass filters, such that each subsignal corresponds to a respective component frequency range; rectifying each of the subsignals to produce a respective DC voltage having an amplitude corresponding to a strength of the respective subsignal; updating a visual display to persistently indicate information corresponding the component frequency range of at least one of the subsignals.

D1. The method of paragraph D0, wherein the splitting and rectifying are performed using an electrical circuit powered only by the AC electrical signal.

D2. The method of paragraph D1, wherein the visual display is operatively connected to the electrical circuit.

D3. The method of paragraph D1, further including attaching the transducer, the electrical circuit, and the visual display, as a package, to a device to be monitored.

D4. The method of paragraph D0, wherein updating the visual display further includes persistently indicating information corresponding to the amplitude of the at least one of the subsignals.

D5. The method of paragraph D4, wherein updating the visual display further includes persistently indicating information corresponding to a duration of the at least one of the subsignals.

D6. The method of paragraph D0, wherein the visual display comprises an array of visual elements.

D7. The method of paragraph D0, wherein each of the visual elements has two possible visual states.

E0. An equipment monitoring system comprising: a transducer configured to convert oscillational energy into an electrical signal having a waveform; a processor in communication with the transducer and with a memory store, the processor including a signature module configured to continually generate, based on the waveform, a spectrogram and a Fourier transform (FT); the processor further including a comparison module in communication with the signature module, the comparison module being configured to identify occurrences of known events by comparing a pattern of features of the generated spectrogram to a plurality of known spectrogram feature patterns stored in the memory store, and to identify possible equipment failures by comparing the generated FT to an expected FT.

E1. The system of paragraph E0, wherein the transducer is disposed in an enclosed space having a plurality of vibration-generating devices, such that the transducer simultaneously receives vibrational pressure oscillations from the plurality of devices.

E2. The system of paragraph E0, wherein the comparison module is configured to compare the FT to an expected FT based on selected failure rules.

E3. The system of paragraph E2, wherein the comparison module is configured to identify an FT peak, the frequency of which is substantially a multiple of an expected peak.

E4. The system of paragraph E0, wherein the signature module is further configured to calculate a hashed index corresponding to a fingerprint of the generated spectrogram, wherein the fingerprint is a set of values that summarizes selected features of the waveform.

E5. The system of paragraph E0, wherein the transducer comprises a piezoelectric element.

E6. The system of paragraph E0, further including a display having a graphical user interface, the display being in communication with the processor.

E7. The system of paragraph E6, wherein the processor is further configured to alert a user to an identified known event via the display.

E8. The system of paragraph E0, wherein the processor is further configured to maintain a count of the occurrences of at least one known event.

E9. The system of paragraph E0, the processor further including a learning module configured to identify a new pattern of spectrogram features, to receive user input of an event label corresponding to the new pattern, and to store the event label and new pattern in the memory store as one of the known spectrogram feature patterns.

F0. A method for monitoring a plurality of devices in a space, the method comprising: sensing oscillational energy produced by a plurality of devices in a space; converting the sensed oscillational energy into an electrical signal having a waveform; continually generating, based on the waveform, a spectrogram and a Fourier transform (FT); identifying an occurrence of a known event by comparing a pattern of features of the generated spectrogram to a plurality of known spectrogram feature patterns; and identifying possible equipment failures by comparing the generated FT to an expected FT.

F1. The method of paragraph F0, further including alerting a user to the occurrence of the known event.

F2. The method of paragraph F0, wherein identifying possible equipment failures includes comparing the generated FT to the expected FT based on a set of selected failure rules.

F3. The method of paragraph F0, further including maintaining a count of occurrences of the known event.

F4. The method of paragraph F0, further including adding a new spectrogram feature pattern to the plurality of known spectrogram feature patterns.

G0. A vibration level indicating sensor, comprising: a piezoelectric element that, when exposed to dynamic vibration, outputs an electric signal having a range of frequencies, the amplitudes of which correspond directly to respective magnitudes of various vibration frequencies that the sensor is exposed to; a set of tiered-frequency band-pass filters for splitting the piezo-electric output electric signal into a plurality of tiered-frequency waveforms, each of the plurality of incrementally higher tiered frequency waveforms corresponding to a respective plurality of vibration frequencies that the vibration sensor is exposed to; a plurality of amplitude sensing circuits respectively receiving the plurality of tiered-frequency waveforms, each amplitude sensing circuit applying an individual voltage output to a plurality of visual indicators; a plurality of visual indicators corresponding to a plurality of incrementally higher amplitude levels for a respective frequency waveform, being connected to an amplitude sensing circuit for the respective the frequency waveform, each visual indicator having a threshold transition voltage above which permanent visible change of the indicator occurs as a result of threshold transition-voltage being applied; wherein each amplitude sensing circuit determines the amplitude level of its respective frequency current waveform and applies a threshold transition-voltage to each individual indicator which corresponds to an amplitude level that is exceeded by the particular frequency waveform, such that a sequential number of linearly aligned visual indicators change in appearance to indicate an amplitude level of a particular vibration frequency, thereby facilitating a visual reading of the peak amplitude for each particular vibration frequency that the vibration sensor was exposed to.

G1. The vibration level indicating sensor of paragraph G0, wherein the visual indicators comprise a temperature-responsive thermo-chromatic material, and the applied threshold transition-voltage is capable of generating sufficient heat to cause a change in appearance in the thermo-chromatic material of the visual indicator.

G2. The sensor of paragraph G0, wherein the amplitude sensing circuits comprise a current rectifier and a tiered resistor network.

G3. The vibration level indicating sensor of paragraph G0, wherein the visual indicator comprises an LED having a threshold transition-voltage above which the LED experiences a permanent visible change in appearance as a result of threshold transition-voltage being applied to the LED for more than a predetermined period of time.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A method of monitoring a device for vibration exposure, the method comprising:
    sensing a vibration using an unpowered transducer coupled to a device being monitored;
    determining a frequency and amplitude of the sensed vibration using an electrical circuit in communication with the transducer, the circuit including a tiered plurality of band pass filters and powered only by an output of the transducer; and
    visually displaying the frequency and amplitude information using a passive display having a plurality of visual indicators wherein each of the visual indicators is configured to change permanently and automatically from a first human readable state to a second human readable state in response to the output of the transducer; and
    wherein the change in human readable state is permanent and persists in the absence of electrical power.

2. The method of claim 1, wherein sensing the vibration includes using a piezoelectric element.

3. The method of claim 1, wherein the electrical circuit includes at least one set of tiered parallel resistive sub-circuits in series with the plurality of band pass filters.

4. The method of claim 1, wherein visually displaying includes permanently changing at least one visual indicator designated to correspond to the frequency information from the first visual state to the second visual state.

5. The method of claim 4, the at least one visual indicator including a number of visual indicators, wherein the number corresponds to the amplitude information.

6. The method of claim 4, further including changing the at least one visual indicator, by a selected amount, from the first visual state to the second visual state, the selected amount corresponding to the amplitude information.

7. The method of claim 1, wherein determining the amplitude of the sensed vibration includes passing at least a portion of the output of the transducer through a rectifier.

8. The method of claim 1, further including mounting the transducer to the device being monitored.

9. The method of claim 1, wherein at least one of the plurality of visual indicators comprises a thermochromatic material.

* * * * *